United States Patent
Hayashi et al.

(10) Patent No.: US 8,067,058 B2
(45) Date of Patent: Nov. 29, 2011

(54) METHOD FOR PRODUCING BATTERY ELECTRODE AND APPARATUS FOR PRODUCING BATTERY ELECTRODE

(75) Inventors: Tetsuya Hayashi, Osaka (JP); Akira Motoi, Osaka (JP); Yasuhiko Takeuchi, Wakayama (JP)

(73) Assignee: Panasonic Corporation, Osaka (JP)

( * ) Notice: Subject to any disclaimer, the term of this patent is extended or adjusted under 35 U.S.C. 154(b) by 311 days.

(21) Appl. No.: 12/515,685

(22) PCT Filed: Dec. 25, 2007

(86) PCT No.: PCT/JP2007/074837
§ 371 (c)(1),
(2), (4) Date: May 20, 2009

(87) PCT Pub. No.: WO2008/081779
PCT Pub. Date: Jul. 10, 2008

(65) Prior Publication Data
US 2010/0062146 A1     Mar. 11, 2010

(30) Foreign Application Priority Data
Dec. 28, 2006 (JP) ................. 2006-354279

(51) Int. Cl.
*H01M 4/00* (2006.01)
*H01M 4/02* (2006.01)
*H01M 4/04* (2006.01)

(52) U.S. Cl. ..... 427/126.3; 427/58; 427/256; 427/126.1; 427/126.4; 427/287; 427/428.01; 427/428.02; 427/428.11; 427/428.06; 427/428.14; 118/200; 118/209; 118/244; 118/256; 118/258; 118/261; 118/262

(58) Field of Classification Search ............. 427/58, 427/122, 126.1, 126.3, 126.4, 428.01, 428.02, 427/428.06, 428.11, 428.14, 256, 287; 118/200, 244, 245, 256, 258, 261, 262
See application file for complete search history.

(56) References Cited

U.S. PATENT DOCUMENTS
| | | | |
|---|---|---|---|
| 2006/0199294 A1* | 9/2006 | Fujikawa et al. | 438/42 |
| 2006/0248710 A1 | 11/2006 | Fukumoto et al. | |
| 2007/0065574 A1* | 3/2007 | Rosati et al. | 427/207.1 |

FOREIGN PATENT DOCUMENTS
| | | | |
|---|---|---|---|
| JP | 60051845 A | * | 3/1985 |
| JP | 2000-202350 | | 7/2000 |
| JP | 2001-179151 | | 7/2001 |
| JP | 2003-276156 | | 9/2003 |
| JP | 2005-074324 | | 3/2005 |
| KR | 2003/089257 A | * | 5/2002 |
| WO | WO 2005/081336 A1 | | 9/2005 |

OTHER PUBLICATIONS
Machine Translation of Matsuo et al. (JP 2005/074324), no date available.*

* cited by examiner

*Primary Examiner* — Michael Cleveland
*Assistant Examiner* — Lisha Jiang
(74) *Attorney, Agent, or Firm* — McDermott Will & Emery LLP

(57) ABSTRACT

The amount of a paint for forming a porous heat-resistant layer supplied to the outer surface of a gravure roll is adjusted by removing the paint with a blade that is disposed so as to contact the outer surface. A resin blade is used, and the position at which the resin blade contacts the outer surface of the gravure roll is changed as the resin blade wears away. This prevents the amount of the paint for forming the porous heat-resistant layer removed from the outer surface of the gravure roll from changing as the resin blade wears away, so that the excess amount of the paint carried on the outer surface of the gravure roll is removed with good accuracy. An almost constant amount of the paint is thus transferred to an electrode surface from the outer surface of the gravure roll, and a porous heat-resistant layer with an almost uniform thickness is stably formed on an industrial scale.

2 Claims, 3 Drawing Sheets

METHOD FOR PRODUCING BATTERY ELECTRODE AND APPARATUS FOR PRODUCING BATTERY ELECTRODE

RELATED APPLICATIONS

This application is the U.S. National Phase under 35 U.S.C. §371 of International Application No. PCT/JP2007/074837, filed on Dec. 25, 2007, which in turn claims the benefit of Japanese Application No. 2006-354279, filed on Dec. 28, 2006, the disclosures of which Applications are incorporated by reference herein.

TECHNICAL FIELD

The invention relates to a method for producing a battery electrode and an apparatus for producing a battery electrode. More particularly, the invention mainly pertains to an improvement in the method for applying a paint for forming a porous heat-resistant layer on an electrode surface.

BACKGROUND ART

As electronic devices are becoming cordless and more portable, it is desired to use non-aqueous electrolyte secondary batteries which have light weight and high energy density as the power source for electronic devices. In fact, the kind of electronic devices powered by non-aqueous electrolyte secondary batteries is significantly increasing. When non-aqueous electrolyte secondary batteries are used for commercial electronic devices, there is a problem to be solved. That is, non-aqueous electrolyte secondary batteries use lithium, which is highly reactive, as an active material, and therefore, in the event of a short-circuit, they produce greater amounts of heat than other commercially available batteries. That is, in non-aqueous electrolyte secondary batteries, when the positive electrode and the negative electrode come into direct contact with each other due to a short-circuit, heat is generated. Thus, the separator (resin porous film) separating the positive electrode from the negative electrode melts around the short-circuited area, so that the contact area of the positive electrode and the negative electrode increases. As a result, the short-circuited area expands and may be overheated. It is therefore common to employ a technique in which a porous heat-resistant layer composed mainly of a heat-resistant resin and an inorganic oxide is used together with the separator to prevent, in the event of a short-circuit, an overheat due to the expansion of the short-circuited area.

The porous heat-resistant layer is provided on the surface of an electrode such as positive electrode or negative electrode, and its thickness is adjusted to approximately 2 to 10 μm so as not to impair the design capacity of the battery. The preferable method for forming a very thin layer of such thickness is the gravure method. The gravure method is a method in which a paint that is a precursor of a porous heat-resistant layer is supplied to the outer surface of a gravure roll with a plurality of depressions, and the paint is transferred from the outer surface of the gravure roll to the surface of an electrode. The paint supplied to the outer surface of the gravure roll spreads over the outer surface of the gravure roll along the depressions. By making the transport direction of the electrode opposite to the rotation direction of the gravure roll, the thickness of the coating film applied to the electrode surface can be precisely controlled, and a thin coating film can be formed.

Also, there has been proposed a technique of providing a blade so as to contact the outer surface of a gravure roll (see, for example, Patent Documents 1 to 3). By providing such a blade, the excess amount of a paint spread over the outer surface of the gravure roll can be removed, so the amount of the paint on the outer surface of the gravure roll can be accurately adjusted. It is thus possible to more precisely control the thickness of the coating film applied to the electrode surface.

However, Patent Document 2 and Patent Document 3 use a metal blade. When a metal blade is brought into contact with a gravure roll for a long period of time, the wearing of the metal blade produces a metal powder, which may adhere to the outer surface of the gravure roll. The metal powder may enter the paint carried on the outer surface of the gravure roll, be transferred to an electrode surface, and finally adhere to, for example, the surface of the porous heat-resistant layer. By the way, an electrode with a porous heat-resistant layer formed thereon is laminated with another electrode of different polarity, with a separator made of a resin or the like interposed therebetween, to form an electrode assembly that is a power generating element. In such an electrode assembly, the adhesion of a metal powder to the porous heat-resistant layer is equal to the inclusion of a conductive foreign substance in the electrode assembly. This can cause a short-circuit, which is a phenomenon of electrical connection between two electrodes inside an electrode assembly due to partial destruction of a separator. Therefore, the techniques of Patent Document 2 and Patent Document 3 are not applicable to the formation of a porous heat-resistant layer on an electrode surface in the formation of a battery electrode.

From such a viewpoint, in utilizing the gravure method to produce a battery electrode, it is necessary to use an insulating material, such as resin, as the blade material so as not to cause a short-circuit even if the blade has worn away and its fragments enter the electrode assembly.

Patent Document 1 does not have a description of the blade material, so it can be construed as suggesting the use of a resin blade. However, with only the use of a resin blade, as the resin blade wears away, it becomes difficult to remove the excess amount of the paint carried on the outer surface of the gravure roll with good accuracy.

It is common to bring the tip of a resin blade into contact with the outer surface of a gravure roll such that the whole resin blade becomes slightly warped. In this case, the contact area of the tip of the resin blade and the outer surface of the gravure roll becomes small, and the excess amount of the paint can be continuously removed with good accuracy. However, as the tip of the resin blade wears away, the warpage of the resin blade decreases and the contact area of the tip of the resin blade and the outer surface of the gravure roll increases. As a result, a greater amount of the paint than the excess amount is removed, the amount of the paint applied to the electrode surface gradually decreases from the predetermined amount, and the thickness of the finally formed porous heat-resistant layer decreases. Since the porous heat-resistant layer is formed between electrodes, it is a factor that determines the distance between the electrodes, and the inter-electrode distance has a large impact on the battery performance of the finally obtained battery. Therefore, a decrease in the thickness of the porous heat-resistant layer inevitably results in variations in the battery performance.

Patent Document 1: Japanese Laid-Open Patent Publication No. 2001-179151

Patent Document 2: Japanese Laid-Open Patent Publication No. 2000-202350

Patent Document 3: Japanese Laid-Open Patent Publication No. 2003-276156

DISCLOSURE OF THE INVENTION

Problem to be Solved by the Invention

An object of the invention is to provide a method and apparatus for producing a battery electrode in which a gravure roll with a blade is utilized to form a porous heat-resistant layer on an electrode surface, and even if the blade has worn away, the excess amount of a paint for forming the porous heat-resistant layer carried on the outer surface of the gravure roll can be removed with good accuracy.

Means for Solving the Problem

The invention is directed to a method for producing a battery electrode. The method includes the steps of:

rotating a gravure roll with a plurality of depressions formed on an outer surface, and supplying a paint for forming a porous heat-resistant layer to the outer surface of the gravure roll so that the paint is carried on the outer surface of the gravure roll;

removing an excess amount of the paint carried on the outer surface of the gravure roll with a resin blade that is disposed so that one end thereof contacts the outer surface of the gravure roll;

changing the position at which the resin blade contacts the outer surface of the gravure roll to control the amount of the paint carried on the outer surface of the gravure roll;

transporting an electrode in the direction opposite to the rotation direction of the gravure roll; and bringing a surface of the electrode into contact with the outer surface of the gravure roll to transfer the paint carried on the outer surface of the gravure roll to the surface of the electrode.

The invention also relates to an apparatus for producing a battery electrode in which a porous heat-resistant layer is formed on a surface of an electrode comprising an electrode core member and an active material layer. The apparatus includes:

a paint container for storing a paint for forming the porous heat-resistant layer;

a gravure roll having a plurality of depressions on an outer surface, the gravure roll being disposed rotatably so that at least a part of the outer surface is immersed in the paint stored in the paint container, the gravure roll transferring the paint carried on the outer surface to the surface of the electrode;

a resin blade disposed so that one end thereof contacts the outer surface of the gravure roll, the resin blade removing an excess amount of the paint carried on the outer surface of the gravure roll;

blade holding means for holding the resin blade, the blade holding means being capable of moving back and forth and changing the position at which the resin blade contacts the outer surface of the gravure roll;

electrode transport means for transporting the electrode in the direction opposite to the rotation direction of the gravure roll and brining the surface of the electrode into contact with the outer surface of the gravure roll;

drying means for drying the paint transferred to the surface of the electrode to form the porous heat-resistant layer;

detection means for detecting the amount of the paint transferred to the surface of the electrode from the outer surface of the gravure roll; and controlling means for moving the blade holding means back and forth depending on a detection result by the detection means.

In a preferable mode of the apparatus for producing a battery electrode according to the invention, the blade holding means includes a blade holding part for holding the resin blade, a pivot for supporting the blade holding part rotatably, and pivot moving means for moving the pivot upward and downward in the vertical direction, and the controlling means, depending on the detection result by the detection means, causes the pivot moving means to move the pivot upward or downward in the vertical direction, thereby moving the blade holding means upward or downward in the vertical direction.

Effect of the Invention

According to the invention, in applying a paint for forming a porous heat-resistant layer on the surface of an electrode by using a gravure roll and a resin blade, even if the resin blade has worn away due to long-term use, the excess amount of the paint carried on the surface of the gravure roll can be accurately removed, and the amount of the paint applied to the electrode can be controlled with good accuracy. It is thus possible to stably form a porous heat-resistant layer having almost the same thickness as the predetermined thickness on the electrode surface. Therefore, there is no variation in the battery performance of finally obtained batteries, and batteries having almost consistent performance can be stably produced on an industrial scale.

There is also very little variation in the thickness of one porous heat-resistant layer. Hence, the whole porous heat-resistant layer exhibits the function of preventing the expansion of a short-circuit on almost the same level, and in addition, on a high level.

Also, since the invention uses a resin blade, no conductive foreign substance such as a metal power adheres to, for example, the surface of the porous heat-resistant layer. Thus, the finally obtained battery is unlikely to short-circuit.

That is, the use of an electrode on the surface of which a porous heat-resistant layer is formed by the method and apparatus of the invention permits stable industrial production of batteries that are free from performance variation, have high performance, and are unlikely to short-circuit, wherein in the event of a short-circuit, the expansion of the short-circuit is prevented in a reliable manner.

BEST MODE FOR CARRYING OUT THE INVENTION

Figure 1:
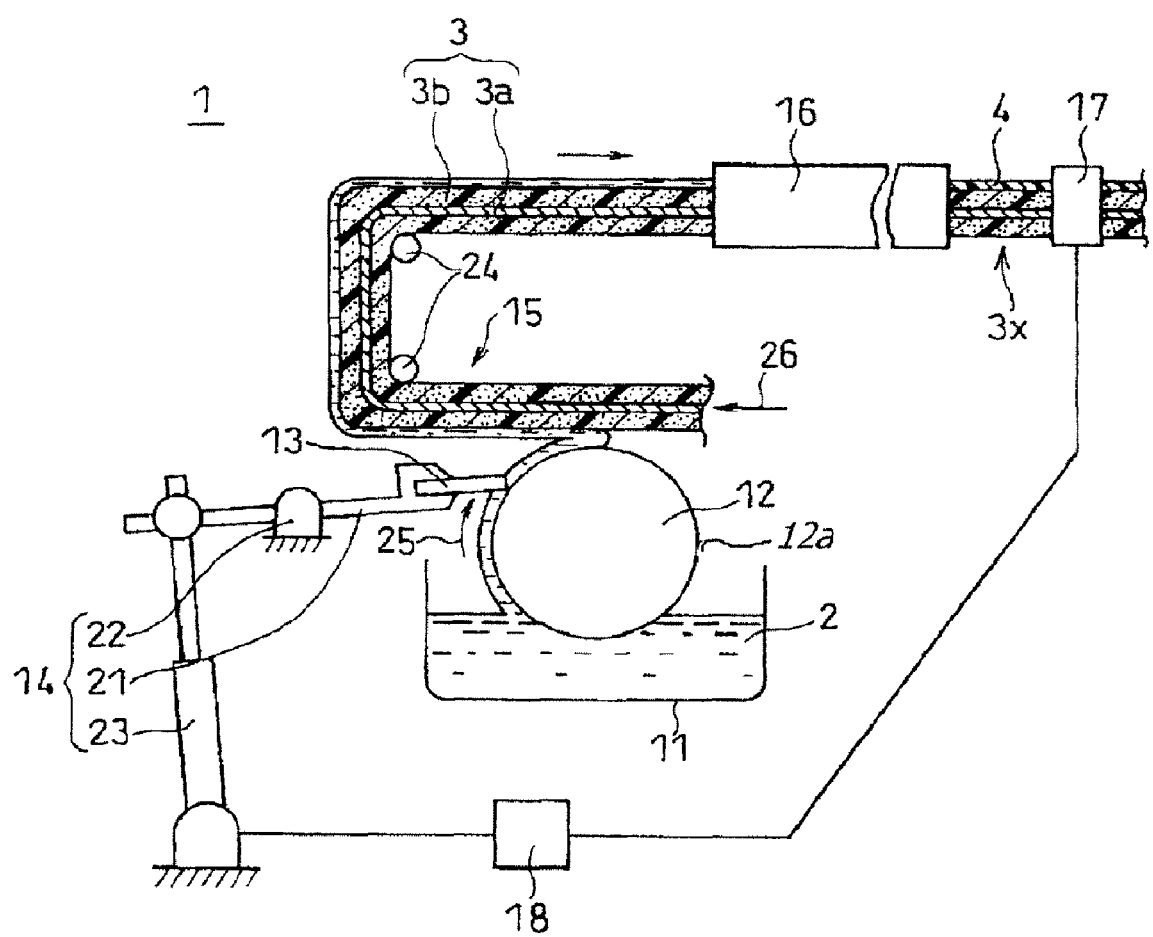
FIG. 1 is a longitudinal sectional view schematically showing the structure of an apparatus for producing a battery electrode in one embodiment of the invention.

FIG. 1 is a longitudinal sectional view schematically showing the structure of a battery electrode production apparatus 1 in one embodiment of the invention.

The battery electrode production apparatus 1 includes a paint container 11, a gravure roll 12, a resin blade 13, a blade holding means 14, an electrode transport means 15, a drying means 16, a detection means 17, and a control means 18, and carries out the battery electrode production method of the invention.

The paint container 11 is a container storing a paint 2 for forming a porous heat-resistant layer (hereinafter referred to as "paint 2"). The paint 2 preferably contains an organic solvent and at least one material having a melting point or thermal decomposition temperature significantly higher than 200° C. Examples of materials having a melting point or thermal decomposition temperature significantly higher than 200° C. include heat-resistant resins such as polytetrafluoroethylene (PTFE), polyimides, and polyamides, and inorganic oxides such as alumina and magnesia. The paint 2 may further contain at least one binder such as polyvinylidene fluoride (PVDF) or rubber particles containing an acrylic monomer (e.g., trade name: BM-500B, available from Zeon Corporation). These binders improve the adhesion between an electrode 3 and a porous heat-resistant layer 4 obtained by drying the paint 2. Also, these binders have suitable heat resistance and low tendency to swell with electrolyte. Thus, the inclusion of these binders in the porous heat-resistant layer 4 can provide an advantage of being able to retain the pores of the porous heat-resistant layer 4 in the battery and maintain ionic conductivity. Any organic solvents can be used without particular limitation if they are capable of dissolving or dispersing the above-mentioned heat-resistant resins, inorganic oxides, binders, and the like, and examples include N-methyl-2-pyrrolidone (NMP).

The gravure roll 12 has a plurality of depressions (not shown) formed on an outer surface 12a, and is disposed so that at least a part of the outer surface 12a is immersed in the paint 2 stored in the paint container 11. Also, the gravure roll 12 is driven by a driving means (not shown) rotatably around the axis in the direction of an arrow 25. The rotation direction of the arrow 25 is opposite to the direction in which the electrode 3 is transported by the electrode transport means 15 which will be described later, i.e., the direction of an arrow 26. Since at least a part of the outer surface 12a of the gravure roll 12 is immersed in the paint 2 stored in the paint container 11, the paint 2 is supplied to the outer surface 12a due to the rotation of the gravure roll 12 itself. The supplied paint 2 spreads over the whole outer surface 12a along the depressions of the outer surface 12a and is carried on the outer surface 12a. A conventional gravure roll can be used as the gravure roll 12.

In this way, by immersing the gravure roll 12 in the paint 2 while rotating it, the step of causing the paint 2 to be carried on the outer surface 12a of the gravure roll 12 in the battery electrode production method of the invention is performed.

The paint 2 carried on the outer surface 12a of the gravure roll 12 is transferred to the surface of the electrode 3 due to the contact of the electrode 3 with the outer surface 12a of the gravure roll by the electrode transport means 15 which will be described later.

The resin blade 13 is a plate-like member that is disposed so that one end contacts the outer surface 12a of the gravure roll 12, while the other end is supported by the blade holding member 14. More specifically, the tip of the resin blade 13 in contact with the outer surface 12a of the gravure roll is warped in the direction of the arrow 25, which is the rotation direction of the gravure roll 12. The resin blade 13 continuously removes the excess amount of the paint 2 carried on the outer surface 12a of the gravure roll 12. By bringing the resin blade 13 into contact with the rotating gravure roll 12 with the paint 2 on the outer surface 12a, the step of continuously removing the excess amount of the paint 2 in the battery electrode production method of the invention is performed.

The synthetic resin constituting the resin blade 13 is not particularly limited; however, it is preferable to use, for example, a synthetic resin that is commonly used as the binder in an active material layer 3b of the electrode 3. In this case, even if a part of the resin blade 13 enters the paint 2 due to wear, it hardly has an adverse effect on the battery performance of the finally obtained battery. Examples of the binder for the active material layer include polyesters such as polyethylene terephthalate and polyolefins such as polypropylene. While the thickness of the resin blade 13 is not particularly limited, it is preferably approximately 0.5 mm.

The blade holding means 14 holds the resin blade 13, and changes the position at which the resin blade 13 contacts the outer surface 12a of the gravure roll. Strictly speaking, it can change not only the position at which the resin blade 13 contacts the outer surface 12a of the gravure roll, but also the part of the resin blade 13 itself in contact with the outer surface 12a of the gravure roll. By this, even if the tip of the resin blade 13 has worn away, the excess amount of the paint 2 can be continuously removed with good accuracy. As a result, it becomes possible to make the thickness of the porous heat-resistant layer 4 formed on the surface of the electrode 3 almost constant, or to change the thickness of the porous heat-resistant layer 4 stepwise with good accuracy. The case of making the thickness of the porous heat-resistant layer 4 almost constant is suited for industrial mass production. Also, the case of changing the thickness of the porous heat-resistant layer 4 stepwise is suited for prototype examination.

By causing the blade holding means 14 to change the position at which the resin blade 13 contacts and/or the contact part of the resin blade 13, the step of controlling the amount of the paint 2 carried on the outer surface 12a of the gravure roll in the battery electrode production method of the invention is performed.

In this embodiment, the blade holding means 14 includes a blade holding part 21, a pivot 22, and a pivot moving means 23. One end of the blade holding part 21 supports the resin blade 13, while the other end is connected to the pivot 22. The pivot 22 supports the blade holding part 21 rotatably around the pivot 22. This permits a more precise control of the position at which the resin blade 13 contacts the outer surface 12a of the gravure roll and/or the contact part of the resin blade 13 with the outer surface 12a of the gravure roll. More specifically, the resin blade 13 can be moved upward and downward by rotation around the pivot 22. In this embodiment, the blade holding part 21 is supported by the pivot 22 rotatably, which is not to be construed as limiting, and it may be fixed to the pivot 22. In this case, also, by causing the pivot moving means 23 to move the pivot 22 toward the outer surface 12a of the gravure roll, the resin blade 13 becomes warped, and it is thus possible to adjust the area of the resin blade 13 in contact with the outer surface 12a of the gravure roll and the amount of the paint 2 removed.

When the pivot moving means 23 receives a control signal from the control means 18 which will be described later, it moves the pivot 22 upward or downward in the vertical direction. The upward or downward movement of the pivot 22 causes the blade holding part 21 and the resin blade 13 to move upward or downward. In this way, indirectly moving the resin blade 13 upward or downward via the pivot 22 allows more freedom in selecting the position of upward or downward movement than directly moving the blade holding part 21 upward or downward, thereby providing an advantage that the amount of the paint 2 removed can be adjusted easily.

Also, the pivot moving means 23 can move the pivot 22 back and forth in the directions closer to and farther away from the outer surface 12a of the gravure roll. When the blade holding part 21 is supported by the pivot 22 rotatably around the pivot 22, the movements of the pivot 22 closer to and farther away from it cause the blade holding part 21 and the resin blade 13 to move upward and downward in the vertical direction. As a result, it is possible to change the position at which the resin blade 13 contacts the outer surface 12a of the gravure roll and/or the contact part of the resin blade 13 with the outer surface 12a of the gravure roll, and adjust the area of the resin blade 13 in contact with the outer surface 12a of the gravure roll. When the blade holding part 21 is fixed to the pivot 22, the movements of the pivot 22 closer to and farther away from it cause a change in the amount of warpage of the resin blade 13, thereby making it possible to adjust the contact area of the resin blade 13 with the outer surface 12a of the gravure roll.

The pivot moving means 23 can be, for example, a device that uses a spring to adjust stroke length, or a cylinder device such as a hydraulic cylinder or an air cylinder. Among them, the use of a cylinder device is preferable in terms of suppressing periodic fluctuations of the applied amount and further improving the accuracy of the applied amount.

The electrode transport means 15 transports the long electrode 3 in the direction of the arrow 26, and brings the surface of the electrode 3, namely, the surface of the active material layer 3b, into contact with the outer surface 12a of the gravure roll. The direction in which the electrode 3 is transported by the electrode transport means 15 (the direction of the arrow 26) is equal to the longitudinal direction of the electrode 3 and is opposite to the rotation direction of the gravure roll 12 (the direction of the arrow 25). Hence, the paint 2 is transferred from the gravure roll 12 to the surface of the active material layer 3b of the electrode 3.

The electrode transport means 15 includes, for example, an electrode feeding means (not shown), an electrode contact means, and an electrode rewinding means (not shown).

By using the electrode transport means 15, the step of transporting the electrode 3 and the step of bringing the electrode 3 into contact with the outer surface 12a of the gravure roll to transfer the paint 2 to the surface of the electrode 3 in the battery electrode production method of the invention are performed.

The electrode feeding means can be, for example, an uncoiler. The uncoiler is a roller-like member provided rotatably around the axis, which is rotated by a driving means (not shown) or rotated by being driven by the rotation of the electrode rewinding means. The long electrode 3 is wound around the outer surface of the uncoiler.

The electrode 3 includes an electrode core member 3a and the active material layer 3b.

When the electrode 3 is a negative electrode, the electrode core member 3a can be made of, for example, a metal foil or a porous material comprising a metal material such as copper, a copper alloy, stainless steel, or nickel. Examples of porous materials include lath and foam. The active material layer 3b is provided on one or both sides of the electrode core member 3a, and contains a negative electrode active material capable of absorbing and desorbing lithium ions. The negative electrode active material can be one commonly used in this field, and examples include carbonaceous materials and materials containing elements that can be alloyed with lithium.

Examples of carbonaceous materials include graphites such as natural graphites (e.g., flake graphite) and artificial graphites, carbon blacks such as acetylene black, ketjen black, channel black, furnace black, lamp black, and thermal black, and carbon fibers. Preferable materials containing elements that can be alloyed with lithium are high capacity materials having a theoretical capacity density of 400 mAh/g or more, and examples include high capacity materials containing at least one of elements such as Al, Zn, Ge, Cd, Sn, Si, and Pb. Among them, preferred are elements such as Si and Sn, oxides such as $SiO_x$ wherein $0<x<2$ and $SnO_y$ wherein $0<y\leq 2$, and transition metal element containing alloys such as Ni—Si alloy, Ti—Si alloy, Mg—Sn alloy, and Fe—Sn alloy, in consideration of the fact that they can absorb large amounts of lithium ions and are readily available. These negative electrode active materials can be used singly or, if necessary, in combination of two or more of them.

When the negative electrode active material contained in the active material layer 3b is in the form of particles, and a negative electrode paste for forming the active material layer 3b is applied to the surface of the electrode core member 3a and dried to form the active material layer 3b, the negative electrode paste may contain a binder, a thickener, etc., in addition to a dispersion medium. For example, various organic solvents such as N-methyl-2-pyrrolidone and water can be used as the dispersion medium. For example, polyvinylidene fluoride (PVDF), styrene-butadiene copolymer (SBR), and modified acrylic acid type polymers can be used as the binder.

A thickener is mainly used when the dispersion medium of the negative electrode paste contains water, and is effective for enhancing the stability of the negative electrode paste. Thus, the thickener is preferably a water-soluble thickener, and for example, carboxymethyl cellulose (CMC) and polyacrylic acid can be used. Also, since many of the above-mentioned high capacity materials have poor conductivity, the use of a conductive agent in combination is preferable. Examples of conductive agents include graphites such as artificial graphites, carbon blacks such as acetylene black and ketjen black, and carbon fibers. When a high capacity material is used as the negative electrode active material, for example, vacuum deposition, sputtering, or plating can also be used to form the active material layer 3b.

When the electrode 3 is a positive electrode, the electrode core member 3a can be made of a metal foil or a porous material comprising a metal material such as aluminum, an aluminum alloy, titanium, or nickel. Examples of porous materials include lath and foam as described above. The active material layer 3b is provided on one or both sides of the electrode core member 3a, and contains a positive electrode active material capable of absorbing and desorbing lithium ions. The positive electrode active material can be one commonly used in this field, and examples include lithium-containing composite oxides, olivine-type lithium salts, chalcogenides, and manganese dioxide. Among them, lithium-containing composite oxides are preferable. Such examples include $LiCoO_2$, $LiNi_aCo_bO_2$ wherein a+b=1, and $LiNi_dMn_eCo_fO_2$ wherein d+e+f=1. These positive electrode active materials can be used singly or in combination of two or more of them.

When the positive electrode active material contained in the active material layer 3b is in the form of particles, and a positive electrode paste for forming the active material layer 3b is applied to the surface of the electrode core member 3a and dried to form the active material layer 3b, the positive electrode paste may contain a binder, a thickener, etc., in addition to a dispersion medium. For example, various organic solvents such as N-methyl-2-pyrrolidone and water can be used as the dispersion medium. For example, PVDF and PTFE can be used as the binder. A thickener is mainly used when the dispersion medium of the positive electrode paste contains water, and is effective for enhancing the stability of the positive electrode paste. Thus, the thickener is preferably a water-soluble thickener, and for example, carboxymethyl cellulose (CMC) and polyacrylic acid can be used. Also, since the above-mentioned positive electrode active materials have poor conductivity, the use of a conductive agent in combination is preferable. Examples of conductive agents include graphites such as artificial graphites, carbon blacks such as acetylene black and ketjen black, and carbon fibers.

The electrode contact means forms the transport path of the electrode 3. It transports the electrode 3 fed from the electrode feeding means in the direction of the arrow 26, bring the surface of the active material layer 3b of the electrode 3 into contact with the outer surface 12a of the gravure roll, and sends the electrode 3 to the electrode rewinding means. The electrode contact means comprises, for example, a plurality of electrode guide rolls 24. The electrode 3 is placed on the electrode guide rolls so that the surface of the electrode 3 on the side of the electrode core member 3a contacts the outer side of the electrode guide rolls. The electrode guide rolls are provided rotatably, and rotate by being driven by the transport of the electrode 3. By disposing the electrode guide rolls at suitable positions, the electrode 3 can be guided from the electrode feeding means via the outer surface 12a of the gravure roll to the electrode rewinding means.

The electrode rewinding means rewinds and stores an electrode 3x with the porous heat-resistant layer 4 formed on the surface on the side of the active material layer 3b. The electrode rewinding means is disposed downstream of the detection means 17 in the transport direction of the electrode 3. The electrode rewinding means can be, for example, an electrode rewinding roll. The electrode rewinding roll is supported by a driving means (not shown) rotatably around the axis, and is rotated by the driving means. The electrode 3x is rewound onto the outer surface of the electrode rewinding roll.

In the transport path of the electrode 3 formed by the electrode transport means 15, the drying means 16 is disposed downstream of the position at which the electrode 3 contacts the gravure roll 12 and upstream of the detection means 17. The drying means 16 dries the coating film comprising the paint 2 transferred to the surface of the electrode 3 at the contact position, to form from the porous heat-resistant layer 4. The drying means 16 can be, for example, a conveyor furnace (tunnel drying furnace). While the drying temperature can be suitably selected depending on the composition of the paint 2, etc., it is preferably approximately 80 to 120° C. The battery electrode production method of the invention may include the step of drying the coating film comprising the paint 2 on the surface of the electrode 3 by means of the drying means 16 to form the porous heat-resistant layer 4.

In the transport path of the electrode 3 formed by the electrode transport means 15, the detection means 17 is disposed downstream of the drying means 16 and upstream of the electrode rewinding means. Also, the detection means 17 is electrically connected to the control means 18. The detection means 17 applies, for example, a fluorescent X ray to the porous heat-resistant layer 4 formed on the surface of the electrode 3, and detects the amount of the paint 2 applied from the reflected amount. Also, the detection means 17 detects the amount of the paint 2 applied from a change in the color of the porous heat-resistant layer 4. The detection result by the detection means 17 is sent to the control means 18. The detection of the applied amount by the detection means 17 is usually conducted at the same time that the electrode 3x with the porous heat-resistant layer 4 is transported to the region detectable by the detection means 17. However, it may be conducted, for example, at intervals of 1 second to 300 seconds. Alternatively, it may be conducted every 0.5 m to 10 m of the transport distance of the electrode 3x.

The control means 18 controls the respective operations in the battery electrode production apparatus 1. For example, it moves the blade holding means 14 upward or downward in the vertical direction depending on the detection result by the detection means 17. By this, it changes the position at which the resin blade 13 contacts the outer surface 12a of the gravure roll and/or the contact part of the resin blade 13 with the outer surface 12a of the gravure roll. The control means 18 is electrically connected to, for example, the detection means 17 and the pivot moving means 23 of the blade holding means 14.

The control means 18 comprises a processing circuit that is realized, for example, by a microcomputer equipped with a central processing unit (CPU) (not shown), a storage means, etc. The storage means can be one commonly used in this field, and examples include read-only memory (ROM), random access memory (RAM), hard disk drive (HDD), and flash memory. The storage means stores, for example, programs for carrying out the respective operations by the gravure roll 12, the resin blade 13, the blade holding means 14, the electrode transport means 15, the drying means 16, and the detection means 17, and standard numerical values for determining when these operations should be started.

Also, the storage means of the control means 18 stores a standard value of the amount of the paint 2 transferred to the surface of the electrode 3 when the resin blade 13 has not worn away. Also, the storage means stores a table showing the relation between the difference between the standard value and the detection result (detected value) sent from the detection means 17 and the amount of the vertical upward or downward movement of the resin blade 13. Such a table can be obtained by performing experiments in advance.

A more detailed description is given of the control means 18 that changes the position at which the resin blade 13 contacts and/or the contact part of the resin blade 13. Generally, in the case of removing the excess amount of a paint carried on the outer surface of a gravure roll with a blade, as the blade wears away over time, the contact area of the blade increases, the amount of the paint removed increases, the amount of the paint transferred to the electrode surface decreases, and the thickness of the resulting porous heat-resistant layer decreases.

When the resin blade 13 wears away, the amount of the paint transferred to the surface of the electrode 3 becomes less than the standard value. The control means 18 compares the detection result (detected value) of the paint amount sent from the detection means 17 with the standard value. When the detection result is lower than the standard value, the control means 18 obtains the difference between the standard value and the detection result. It then compares the obtained difference with the table stored in the storage means, and calculates the moving direction of the resin blade 13 and the moving amount thereof. Based on the calculation result, the control means 18 sends a control signal to the pivot moving means 23 to move the resin blade 13 upward in the vertical direction so as to decrease the contact area of the resin blade 13 with the outer surface 12a of the gravure roll. If the value detected by the detection means 17 is higher than the standard value, the control means 18 calculates the moving direction of the resin blade 13 and the moving amount thereof, as described above. Based on the calculation result, the control means 18 sends a control signal to the pivot moving means 23 to move the resin blade 13 downward in the vertical direction so as to increase the contact area of the resin blade 13 with the outer surface 12a of the gravure roll.

Figure 2:
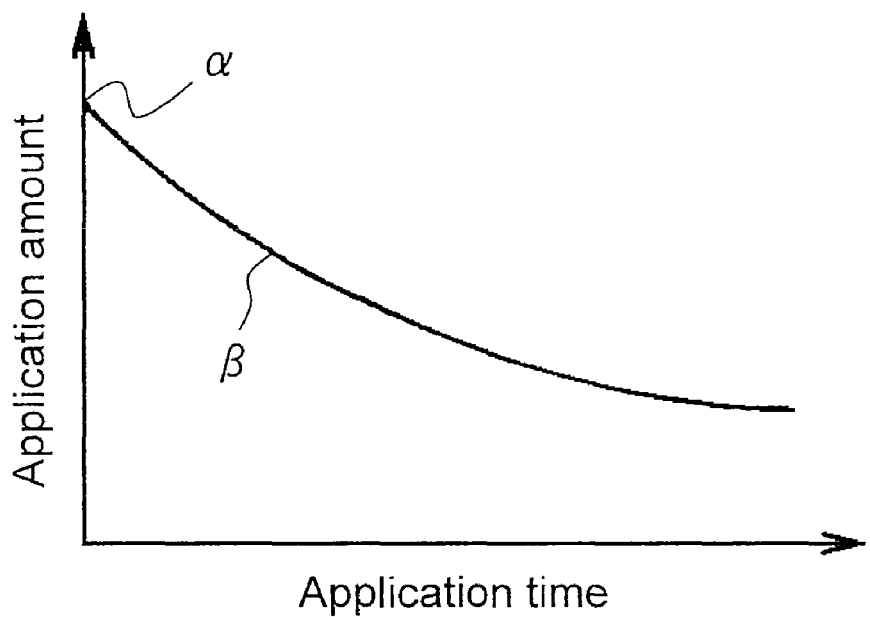
FIG. 2 is a graph showing a change over time in the applied amount of a paint for forming a porous heat-resistant layer in conventional art.
Figure 3:
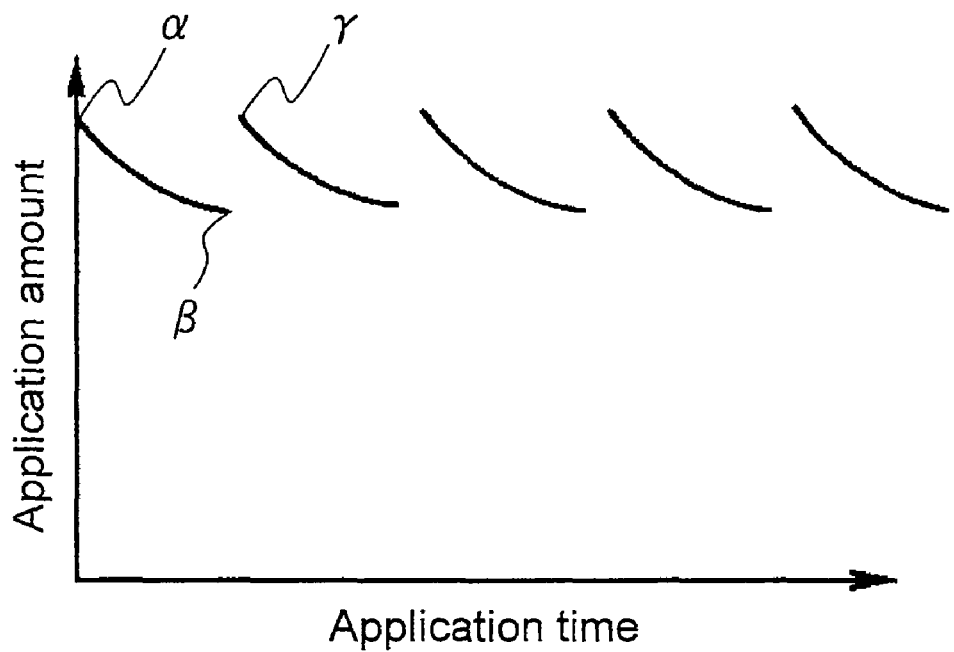
FIG. 3 is a graph showing a change over time in the applied amount of a paint for forming a porous heat-resistant layer in the invention.
Figure 4:
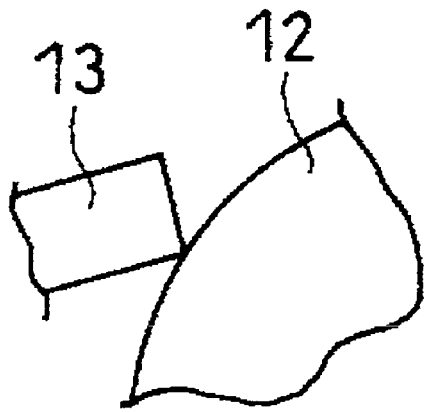
FIG. 4 is a partially enlarged, longitudinal sectional view schematically showing the state of contact of a blade with the outer surface of a gravure roll at point a shown in FIG. 2 and FIG. 3.
Figure 5:
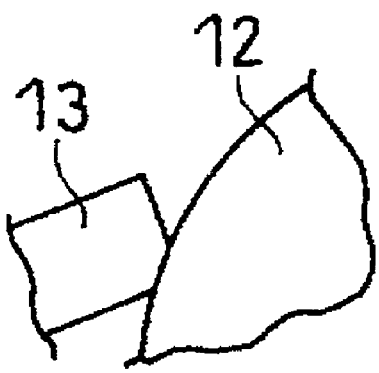
FIG. 5 is a partially enlarged, longitudinal sectional view schematically showing the state of contact of the blade with the outer surface of the gravure roll at point β shown in FIG. 2 and FIG. 3.
Figure 6:
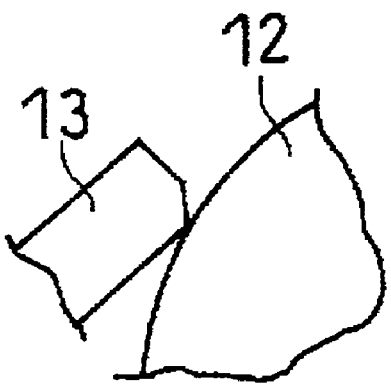
FIG. 6 is a partially enlarged, longitudinal sectional view schematically showing the state of contact of the blade with the outer surface of the gravure roll at point γ shown in FIG. 3.

FIG. 2 is a graph showing a change over time in the amount of the paint 2 applied in conventional art. FIG. 3 is a graph showing a change over time in the amount of the paint 2 applied by the battery electrode production apparatus 1 of the invention. FIG. 4 is a partially enlarged, longitudinal sectional view schematically showing the state of contact of the resin blade 13 with the outer surface 12a of the gravure roll at point α shown in FIG. 2 and FIG. 3. FIG. 5 is a partially enlarged, longitudinal sectional view schematically showing the state of contact of the resin blade 13 with the outer surface 12a of the gravure roll at point β shown in FIG. 2 and FIG. 3. FIG. 6 is a partially enlarged, longitudinal sectional view schematically showing the state of contact of the resin blade 13 with the outer surface 12a of the gravure roll at point γ shown in FIG. 3.

As illustrated in FIG. 4, when the resin blade 13 has not worn away, the contact area of the resin blade 13 with the outer surface 12a of the gravure roll is small, so the excess amount of the paint 2 can be continuously removed with good accuracy. Thus, a proper amount of the paint 2 is applied (transferred) to the surface of the electrode 3. This corresponds to the position α in FIG. 2 and FIG. 3.

However, as illustrated in FIG. 5, when the tip of the resin blade 13 has worn away, the contact area of the resin blade 13 with the outer surface 12a of the gravure roll gradually increases, so that a greater amount of the paint 2 than the excess amount is removed. Hence, the amount applied (transferred) to the surface of the electrode 3 gradually decreases. This corresponds to the position β in FIG. 2 and FIG. 3.

As illustrated in FIG. 6, if the resin blade 13 is moved upward in the vertical direction to change the position at which the resin blade 13 contacts or the contact part of the resin blade 13, the contact area of the resin blade 13 with the outer surface 12a of the gravure roll becomes small again. As a result, it becomes possible again to continuously remove the excess amount of the paint 2 with good accuracy, so that a proper amount of the paint 2 is applied (transferred) to the surface of the electrode 3. This corresponds to the position γ in FIG. 3.

By repeating this control, even if the porous heat-resistant layer 4 is formed on the surface of the electrode 3 over a long period of time, it becomes possible to reduce the change in the applied (transferred) amount. It is therefore possible to supply a battery with stable battery performance. Also, there is no need to perform the troublesome operation of suspending the line after a short-period operation in order to replace the resin blade 13.

A simple method for compensating for the wear of the resin blade 13 is, for example, a method of gradually pushing the resin blade 13 toward the outer surface 12a of the gravure roll depending on variation in the applied (transferred) amount, rather than changing the position at which the resin blade 13 contacts. However, according to this method, it is difficult to smoothly push the resin blade 13. Thus, although the applied (transferred) amount is adjusted to some extent,

The invention claimed is:

1. A method for producing a battery electrode, comprising the steps of:
rotating a gravure roll with a plurality of depressions formed on an outer surface, and supplying a paint for forming a porous heat-resistant layer to the outer surface of the gravure roll so that the paint is carried on the outer surface of the gravure roll;
removing an excess amount of the paint carried on the outer surface of the gravure roll with a resin blade that is disposed so that one end thereof contacts the outer surface of the gravure roll;
causing blade holding means to change the position at which the resin blade contacts the outer surface of the gravure roll and the part of the resin blade in contact with the outer surface of the gravure roll to control the amount of the paint carried on the outer surface of the gravure roll, the blade holding means including a blade holding part for holding the resin blade, a pivot for supporting the blade holding part rotatably, and pivot moving means for moving the pivot upward and downward in the vertical direction;
transporting an electrode in the direction opposite to the rotation direction of the gravure roll; and
bringing a surface of the electrode into contact with the outer surface of the gravure roll to transfer the paint carried on the outer surface of the gravure roll to the surface of the electrode.

2. An apparatus for producing a battery electrode in which a porous heat-resistant layer is formed on a surface of an electrode comprising an electrode core member and an active material layer,
the apparatus comprising:
a paint container for storing a paint for forming the porous heat-resistant layer;
a gravure roll having a plurality of depressions on an outer surface, the gravure roll being disposed rotatably so that at least a part of the outer surface is immersed in the paint stored in the paint container, the gravure roll transferring the paint carried on the outer surface to the surface of the electrode;
a resin blade disposed so that one end thereof contacts the outer surface of the gravure roll, the resin blade removing an excess amount of the paint carried on the outer surface of the gravure roll;
blade holding means including a blade holding part for holding the resin blade, a pivot for supporting the blade holding part rotatably, and pivot moving means for moving the pivot upward and downward in the vertical direction, the blade holding means changing the position at which the resin blade contacts the outer surface of the gravure roll and the part of the resin blade in contact with the outer surface of the gravure roll;
electrode transport means for transporting the electrode in the direction opposite to the rotation direction of the gravure roll and brining the surface of the electrode into contact with the outer surface of the gravure roll;
drying means for drying the paint transferred to the surface of the electrode to form the porous heat-resistant layer;
detection means for detecting the amount of the paint transferred to the surface of the electrode from the outer surface of the gravure roll; and
controlling means for causing the pivot moving means to move the pivot upward or downward in the vertical direction, thereby moving the blade holding means upward or downward in the vertical direction, depending on a detection result by the detection means.

* * * * *